United States Patent [19]

Imai et al.

[11] 4,295,595
[45] Oct. 20, 1981

[54] METHOD OF PRODUCING MAGNETRON ANODE

[75] Inventors: Kuninori Imai, Shiroyamamachi; Soji Takahashi, Hachioji, both of Japan

[73] Assignee: Hitachi, Ltd., Tokyo, Japan

[21] Appl. No.: 6,484

[22] Filed: Jan. 25, 1979

[30] Foreign Application Priority Data

Jan. 25, 1978 [JP] Japan .................................. 53-6198
Jan. 27, 1978 [JP] Japan .................................. 53-7251

[51] Int. Cl.³ .............................................. B23K 28/02
[52] U.S. Cl. .................................. 228/161; 29/25.17; 228/173 A; 228/193
[58] Field of Search ............... 228/173 R, 173 A, 265, 228/131, 193, 161; 29/522, 25.17

[56] References Cited

U.S. PATENT DOCUMENTS

| | | | |
|---|---|---|---|
| 3,315,333 | 4/1967 | Kind et al. | 29/522 X |
| 3,893,226 | 7/1975 | Waite | 228/193 X |
| 4,015,765 | 4/1977 | Ahmed | 228/173 A X |
| 4,072,817 | 2/1978 | Waite | 228/173 A X |
| 4,200,217 | 4/1980 | Imai et al. | 228/161 |

Primary Examiner—Howard N. Goldberg
Assistant Examiner—K. J. Ramsey
Attorney, Agent, or Firm—Craig and Antonelli

[57] ABSTRACT

In order to provide a method of producing magnetron anode at a good mass-produceability, according to the invention, so-called straight type steel cylinder blank the inner peripheral surface of which is not tapered is used and, at the same time, the step of quench-hardening of the steel cylinder blank is omitted. After fitting a copper block to the inside of the straight type steel cylinder blank which has not been quenched, both members are compacted to each other. Then, a press working is effected on the copper blank such that the steel cylinder blank and a back-up punch are forced to move relatively to each other, when a press-working shaping punch is forced into the copper block, thereby to form a copper anode. In order to avoid the bursting of the steel cylinder blank, the press work on the copper block is effected at a temperature of 200° to 650° C.

14 Claims, 9 Drawing Figures

FIG. 1
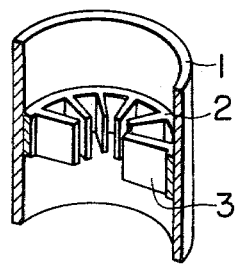
FIG. 2a
PRIOR ART
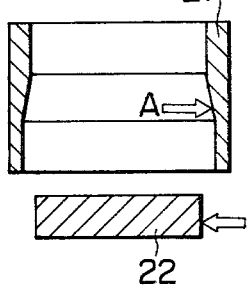
FIG. 2b
PRIOR ART
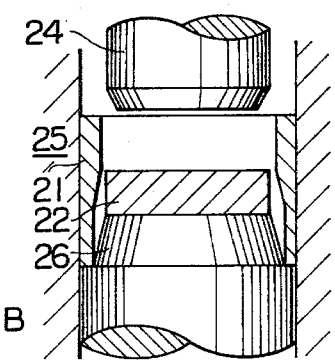
FIG. 2c
PRIOR ART
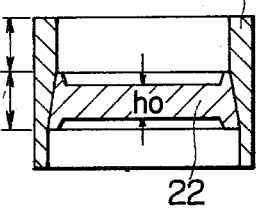
FIG. 2d
PRIOR ART
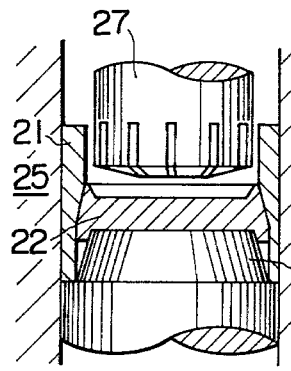
FIG. 2e
PRIOR ART
FIG. 2f
PRIOR ART
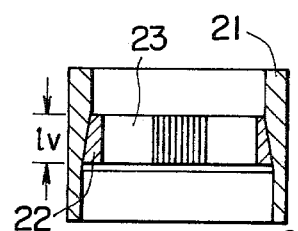

METHOD OF PRODUCING MAGNETRON ANODE

BACKGROUND OF THE INVENTION

The present invention relates to a method of producing magnetron anode for use in household microwave oven.

One of the conventional magnetron anodes for use in household microwave oven has, as shown in FIG. 1, a circular steel cylinder 1 to the inner peripheral surface of which secured is a copper anode, i.e. a circular copper cylinder 2 which in turn is provided at its inside with a plurality of radial copper vanes 3. Also, a process as shown in FIG. 2 has been proposed, for example, in the specification of U.S. Ser. No. 819,056 filed July 26, 1977, now U.S. Pat. No. 4,200,217, as a method of producing the magnetron anode of the type described above.

In order to clarify the drawback of the prior art, a description will be made hereinafter as to the conventional method with reference to FIGS. 2a to 2f.

As shown in FIG. 2a, a steel cylinder blank material 21 having a wholly or partially tapered inner peripheral surface and a disc-shaped copper member 22 are used as the blank materials for the circular steel cylinder and the copper anode, respectively. After cleaning the inner peripheral surface A of the steel cylinder blank material 21 and the outer peripheral surface B of the disc-shaped copper member 22 as shown in FIG. 2a, the steel cylinder blank material 21 is placed in a die 25 and the disc-shaped copper member 22 is fitted to the inside of the steel cylinder blank material 21, as shown in FIG. 2b. Then, a plastic working is effected on the disc-shaped copper member 22 in the steel cylinder blank material 21, by means of a shaping punch 24 and a back-up punch 26, so that the outer peripheral surface of the disc-shaped copper member 22 may be closely and tightly fitted to the inner peripheral surface of the steel cylinder blank material 21, as shown in FIG. 2c. This step for obtaining the close and tight fit will be referred to as "compaction", hereinafter. The composite member as shown in FIG. 2c is then subjected to a press work by a shaping punch 27 having the illustrated shape, after a preheating, so that a plurality of vanes 23 as shown in FIG. 2e are shaped. This step will be referred to as vane-shaping, hereinafter. During this vane-shaping, the steel cylinder blank material 21 is naturally raised, due to the presence of the tapered interface. Finally, the half-finished article as shown in FIG. 2e is subjected to an after processing and then to a diffusion annealing, so as to become a magnetron anode having a construction as shown in FIG. 2f. The copper anode consisting of a circular copper cylinder 2 and a plurality of copper vanes 3 integral therewith is thus attached to the inner peripheral surface of the circular steel cylinder 1 at a high reliability.

As has been stated, the conventional method requires the use of a material having tapered inner surface, as the blank for the circular steel cylinder. Usually, this tapered inner surface is processed by means of a lathe or the like, at a cost of considerably long working time. This inconveniently hinders the mass production of the magnetron anode.

It is therefore expected that the mass-produceability of the magnetron anode can be remarkably improved if the taper of the inner peripheral surface of the steel cylinder blank material is dispensed with.

It is impossible, however, to shape the copper anode vanes having a complicated shape as shown in FIG. 1 with a required precision and a good compaction to the inside of the circular steel cylinder, by the described conventional method, if the steel cylinder blank material lacks the tapered inner surface, i.e. if a straight steel cylinder blank material is used as the blank material for the circular steel cylinder. In other words, it has been essential in the conventional method to wholly or partially taper the inner peripheral surface of the steel cylinder blank material.

The described conventional method involves another problem. In this conventional method, the copper blank is subjected to a plastic working while it is embraced by the steel cylinder blank material. Therefore, during the pressing under room temperature or a secondary plastic working which is effected at a high temperature, the steel cylinder blank material 1' is likely to be deformed plastically by the shaping force exerted on the copper blank 2', as shown in FIG. 3, or even made to burst by such a force.

To avoid this, it has been necessary to previously quench-harden the steel cylinder blank material. The adoption of this quench-hardening requires a considerably long time, not only for the heating and quenching, but also for the elimination of oxidation film and distortion in shape which is caused as a result of the quenching, which also hinders the mass production of the magnetron anode.

SUMMARY OF THE INVENTION

Under these circumstances, the present invention aims as its major object at providing a method of producing magnetron anode having a good mass-produceability.

Another object of the invention is to provide a method of producing magnetron anode, which is suitable, due to the use of a steel cylinder blank material the inner peripheral surface of which is not tapered, for a mass production of the magnetron anode.

Still another object of the invention is to provide a method of producing magnetron anode, which is suitable, thanks to the elimination of quench-hardening of steel cylinder blank material which has posed a problem in the conventional method, for a mass production of the magnetron anode.

To these ends, according to the invention, there is provided a method of producing magnetron anode, in which a straight steel cylinder blank material is used, and the quench-hardening of the same blank material is eliminated.

More specifically, according to the method of the invention, a copper block is fitted to the inside of a straight steel cylinder blank material which has not been quenched, and both members are compacted with each other. Then, a press working is effected such that the steel cylinder blank material and the back-up punch are forcibly moved relatively to each other, when a shaping punch for press working is inserted into the copper block, thereby to shape the copper anode. In order to avoid the aforementioned bursting of the steel cylinder blank material during the press work, the pressing work is conducted at an elevated temperature of the copper block of between 200° C. to 300° C.

BRIEF DESCRIPTION OF THE DRAWINGS

FIG. 1 is a sectional view of a magnetron anode which is used most broadly,

FIGS. 2a–2f show the steps of a conventional process of manufacturing magnetron anode.

DESCRIPTION OF THE PREFERRED EMBODIMENT

Hereinafter, the invention will be described through a specific embodiment.

Figure 4:
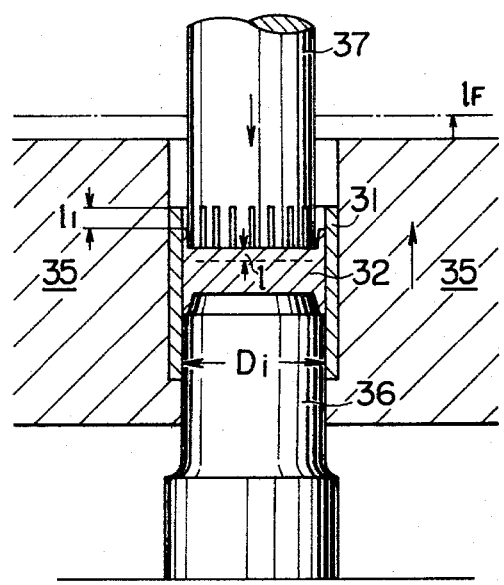
FIG. 4 shows the step of press work in a process in accordance with the invention for producing magnetron anode.

According to the invention, in order to achieve the aforementioned objects of the invention, the copper anode is press-formed by making use of a straight steel cylinder blank material and both members are pressfitted or welded to each other. This is made by forcibly raising the straight steel cylinder blank material 31, when the vane-shaping punch 37 is forced into the copper blank 32, in the direction reverse to the penetration of the shaping punch 37, as illustrated in FIG. 4.

In order to obtain a good welding, it is important to maintain a constant length $l_1$ between the upper end of the steel cylinder 31 and the copper blank, i.e. not to allow a sliding of the portion of length $l_1$. It is therefore necessary that the amount of rise $l_F$ of the steel cylinder blank material 31 is equal to or smaller than a length $(R-1) l$, where $l$ and $R$ represent, respectively, the amount of penetration of the vane-shaping punch 37 and the extrusion ratio (cross-sectional area of copper disc as shown in FIG. 7 (c)cross-sectional area of copper anode as shown in FIG. 7 (f).

The raising of the steel cylinder blank material can be effected by various ways. For instance, it is possible to raise the die 35, which is loaded with the steel cylinder blank material 31 as shown in FIG. 4, by means of a hydraulic servo mechanism. When this raising measure is adopted, the time at which the raising of the die 35 is commenced is preferably selected to fall within a time region between the instant at which vance-shaping punch 37 comes to contact with the copper blank and the instant at which the vane shaping is actually started. More preferably, the raising of the die 35 is started simultaneously with the start of the actual shaping of vanes.

Figure 5:
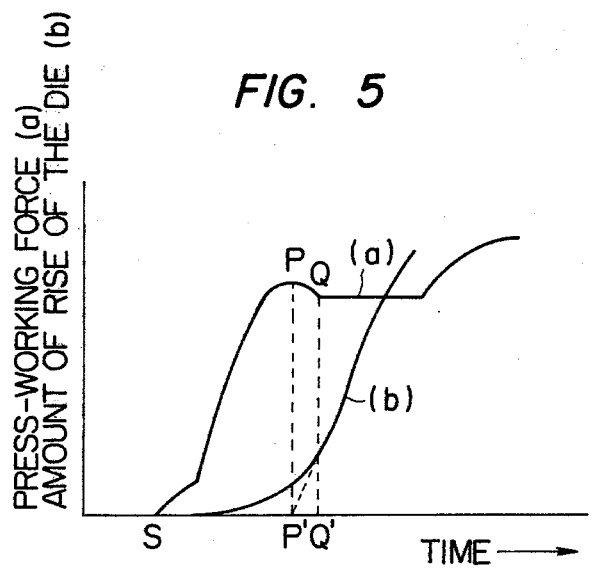
FIG. 5 is a characteristic chart showing the relation between the press-working force and the rise of the die.

FIG. 5 shows the relation between the pressing force to be exerted by the vane-shaping punch and the timing of raising of the die. In FIG. 5, symbols a and b denote, respectively, the press-working force and the amount of rise of the die. The instant at which the press working is commenced and the instant at which the shaping of vanes is actually started are denoted, repectively, by symbols S and P. The constant plastic flow of metal is commenced at an instant Q.

As stated before, it is preferred to start the raising of the die at an instant between the instants S and Q.

More preferably, the raising of the die is commenced at the instant P, at which the shaping of the vanes is actually started.

At the same time, for the reason stated before, the rate of die travel is $(R-1)$ times that of the rate of penetration of the vane-shaping punch or smaller.

Figure 6:
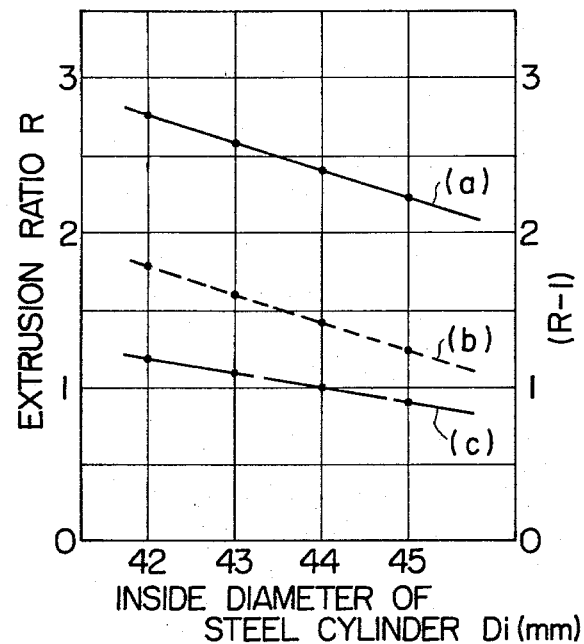
FIG. 6 is a characteristic chart showing the relation between the inside diameter of the steel cylinder blank material and the extrusion ratio.

FIG. 6 shows the relation between the inside diameter Di of the steel cylinder blank material and the extrusion ratio R. In FIG. 6, the level of the extrusion ratio R and the level of $(R-1)$ corresponding the level of R are shown by linear curves a and b, respectively. Thus, the linear curve b shows the upper limit of the ratio of the amount of rise of the steel cylinder blank material to the amount of the shaping-punch penetration, or the ratio of rate of die travel to the rate of shaping-punch penetration.

More specifically, the $(R-1)$ takes values of about 1.8, 1.6, 1.4 and 1.25, for respective diameters Di of 42, 43, 44, and 45 mm. The linear curve c represents the optimum values of the above-mentioned ratio for respective inside diameters Di. Namely, the optimum ratios are about 1.2, 1.1, 1.0 and 0.9, for these inside diameters. These optimum values amount, respectively, to about 70% of the upper limit values, and further denote the lower limit values for the respective inside diameters Di.

Thus, provided that a steel cylinder blank material having an inside diameter Di of 43 mm is used, the amount of rise $l_F$ of the steel cylinder blank material has to be 1.6 times as large that of the shaping-punch penetration $l$ or smaller, and is preferably 1.1 times as large that of the penetration $l$. In other words, the rate of rise of the steel cylinder blank material, i.e. the rate of die travel has to be 1.6 times as large that of the rate of penetration of the shaping punch or smaller, and is preferably 1.1 times as large that of the rate of penetration.

It is possible to use, instead of the aforementioned hydraulic mechanism for raising the steel cylinder blank material, a specific press machine having an additional function to rise the die. It is also possible to retract the back-up punch at a rate corresponding to the penetration of the vane-shaping punch into the copper blank, instead of raising the die.

Other advantages offered by the invention reside in that the quenching of the steel cylinder blank material is eliminated, without being accompanied by the unfavourable bursting of the same, and the welding strength between the circular steel cylinder and the copper anode is enhanced.

These advantages are brought about by the following measures: (1) to reduce the level of force required for the compaction, by using a pre-formed copper blank, (2) to use a steel having a flow stress at least twice as large that of the copper, as the material of the steel cylinder blank material, and (3) to adopt an appropriate temperature under which the shaping of vanes is performed.

These measures (1) to (3) will be described in detail hereinunder.

Referring first to the use of the pre-formed blank, the purpose of the compacting is to prevent the region of welding required in the product, i.e. the region represented by lv in FIG. 2f from being oxidized during heating at high temperature. Therefore, the length ls of the region over which the steel and the copper intimately contact each other as shown in FIG. 2c must be larger than the length lv. And then, lv must be equal to or larger than the length l's as shown in FIG. 2c.

In some cases, the adopted length ls is smaller than the length lv. In such a case, as shown in the later-mentioned FIG. 7b, the copper blank is provided with a cylindrical portion C of a length l4, and is compacted to the inner peripheral surface of the circular steel cylinder at the periphery of the cylindrical portion C. This conveniently contributes to the economization of the copper material.

In this case, the steel cylindrical blank material is moved simultaneously with the penetration of the vane-shaping punch into the copper blank, so that the vanes are formed down to the portion of the copper blank where the cylinder C is provided. It is necessary, however, to make the size of the back-up punch at each step of the process to allow a plastic spreading of the cylindrical portion of the copper, in order that the copper blank may not be separated from the inner peripheral surface of the steel cylinder blank material.

Figure 3:
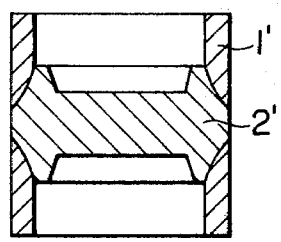
FIG. 3 is a schematic sectional view showing a bursting of a steel cylinder blank material during pressing.

In the conventional process in which the copper is shaped in the steel cylinder blank material as shown in FIG. 2, the force required for the shaping is so large that the steel cylinder blank material may be bursted as shown in FIG. 3, unless the steel cylinder blank material is suitably quenched.

Figures 7A, 7B, 7C:
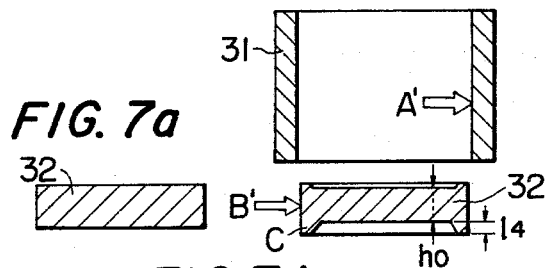
FIGS. 7a–7f show, the steps of a method in accordance with an embodiment of the invention.
Figure 7D:
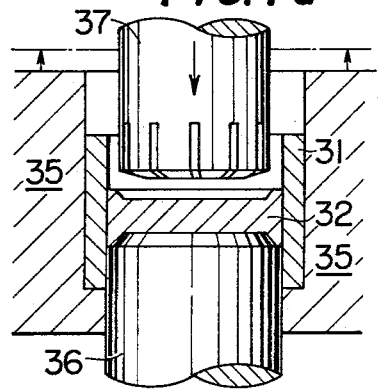

In order to avoid this bursting of the steel cylinder blank material, the disc-shaped copper blank 32 having a shape as shown in FIG. 7a is pre-formed into a form as shown in FIG. 7b. Then, the surfaces indicated by arrows A' and B' of the steel cylinder blank material 31 and the copper blank 32 are cleaned. Subsequently, both members are fitted to each other and a compaction effected under the room temperature, as shown in FIG. 7c. Then, after preheating both members as shown in FIG. 7d, a press work is effected on the copper blank 32 in the steel cylinder blank material 31, so as to shape the vanes. In the above-stated process, it is possible to reduce the compacting force down to such a low level at which the plastic deformation of the copper is started. At the same time, the oxidation of the region of length Ls is prevented during the heating at a high temperature.

Referring now to the aforementioned measures (2) and (3), i.e. the flow stress of the steel cylinder blank material and the temperature at which the vanes are shaped, in order to avoid excessively large distortion or the bursting of the steel cylinder blank material, it is necessary that the flow stress of the steel cylinder blank material has to be at least two times as large that of the copper, during the compaction which is conducted under the room temperature. At the same time, in order to prevent the excessively large distortion or the bursting of the steel cylinder blank material during the vane-shaping which is conducted at a high preheating temperature, the flow stress of the steel cylinder blank material has to be at least 4.5 times as large that of the copper.

In order to obtain above specified ratios of the flow stress, it is necessary to suitably select the material of the steel cylinder blank material and the temperature at which the vanes are shaped.

Particularly, such a steel as would exhibit a blue-brittleness phenomenon and, accordingly, an increased flow stress at the vane-shaping temperature is recommended as the material for the steel cylinder blank material.

It is thus possible, by adopting the above-stated specific material and the vane-shaping temperature, to eliminate the quench-hardening of the steel cylinder blank material.

FIG. 7 shows the process in accordance with a practical embodiment of the invention. In this process, a work-hardened carbon steel tube for machine structural purpose (JIS STKM-17C, 0.45 to 0.55%C, 43 mm inner dia., 48 mm outer dia. and 35 mm high) was used as the straight steel cylinder blank material, while a disc-shaped blank material (43 mm diameter, about 11 mm thick) of oxygen free copper was used as the blank material of the copper anode.

At first, the copper blank 32 having a form as shown in FIG. 7a was pre-formed into a form as shown in FIG. 7b (ho=8 to 8 mm, l4=5 mm, total thicknesss 14 to 15 mm). Then, both of the copper blank 32 and the steel cylinder blank material 31 were subjected to a degreasing. Then, the inner peripheral surface of the steel cylinder blank material 31 and the outer peripheral surface of the copper blank 32 were cleaned by machining and by means of a wire brush, respectively. Subsequently, both members were fitted to each other as shown in FIG. 7c, while paying attention not to contaminate the cleaned surfaces, and a cold compaction was conducted under the room temperature. For the compaction, the force by which the copper blank 32 can be plastically deformed is required.

The steps down to the step of compaction may be made in different ways. For instance, the process may be modified such that, after cleaning the outer peripheral surface of the copper blank 32 as shown in FIG. 7a and the inner peripheral surface of the steel cylinder blank material 31 as shown in FIG. 7b, the two members are fitted to each other in a manner as to preclude the contamination of the cleaned surfaces, as shown in FIG. 7c, and then the cold compaction is effected.

Figure 7E:
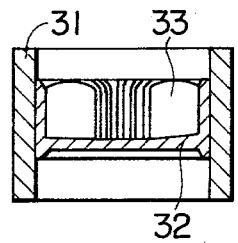

The compacted body including the copper and steel materials was then preheated up to the vane-shaping temperature which ranges between 300° C. and 650° C. Then, a press working was effected on the copper blank 32 embraced by the steel cylinder blank material 31, so as to form and shape a plurality of vanes 33 as shown in FIG. 7e.

In this process, as stated before, it is necessary to forcibly raise the steel cylinder blank material 31, during the penetration of the vane-shaping punch 37 into the copper blank 32.

In the described embodiment, a hydraulic servo mechanism was used for lifting the die 35 by which the steel cylinder blank material 31 is held, thereby to raise the latter. In this case, the back-up punch 36 was kept stationary. The instant of raising of the die 35 was made to coincide with the instant at which the shaping of the vane is actually started by the vane-shaping punch 37 as the latter is lowered. At the same time, the amount or rate of die travel was selected to be 1.1 times as large that of the penetration of the vane-shaping punch 37.

Figure 7F:
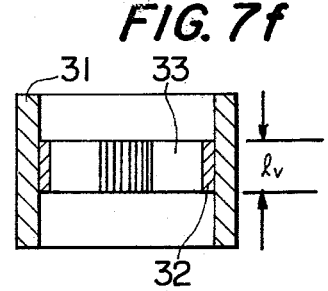

After the shaping of the vanes, a post-treatment was conducted to obtain a product as shown in FIG. 7f is which lv is 12 mm. Further, in order to enhance the weld strength, a diffusion annealing was effected at an annealing temperature of 800° C. for 10 to 60 minutes.

Consequently, a copper anode having a plurality of vanes was formed within a straight circular steel cylinder having high precision and good welding strength, without taking the step of quench-hardening of the steel cylinder blank material, while avoiding the bursting of the latter.

Figure 8:
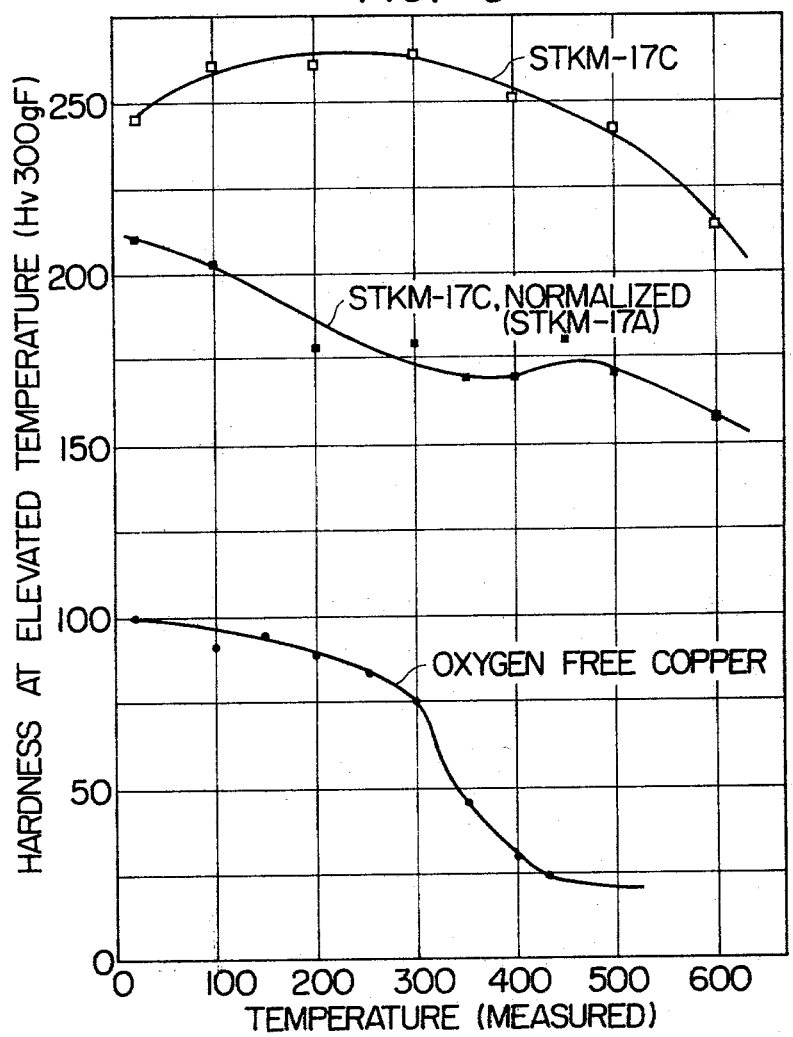
FIG. 8 is a characteristic chart showing the hardnesses of a steel cylinder blank material and a copper blank material.

FIG. 8 shows the hardnesses at elevated temperature measured for the materials as used in the described embodiment. Since in usual case the hardness is in direct proportion to the flow stress, it is possible to know the ratio of the flow stress of the steel cylinder blank material to that of the copper blank from the data as shown in FIG. 8.

Namely, the ratio of the flow stress of STKM-17C to that of oxygen free copper is about 2.5 under the room temperature and about 5 in an atmosphere of 350° C. or higher temperature.

The above-mentioned ratio is somewhat lowered when a material obtained by normalizing the STKM-17C, i.e. a material corresponding to STKM-17A, is used as the material for the steel cylinder blank material. In this case, however, the bursting of the steel cylinder blank material as shown in FIG. 3 was not observed also, when the shaping of vanes is effected at a temperature between 420° C. and 600° C. In consideration of the above, it is derived that, in the process of the invention, the above-mentioned ratio of flow stress has to be at least 2 under the room temperature, and at least 4.5 at the vane-shaping temperature.

Although STKM-17C steel or STKM-17A steel were used in the described embodiment, the material of the steel cylinder blank is not limited to these steel containing more than 0.45% of carbon. For instance, low alloyed steels such as those containing Ni, Cr or the like, which are liable to exhibit a blue brittleness, can be used as the material for the steel cylinder blank. In such a case, the vane-shaping can be conducted without incurring the breakage of the steel cylinder blank, even at a low temperature of around 200° C.

Similarly, the oxygen free copper as mentioned in the description of the embodiment is not exclusive, and the copper blank may be made of other copper materials such as commercially available pure alloy of 99.9% purity. When, different materials are used, the processing conditions such as vane-shaping temperature, annealing temperature, annealing time and so forth are suitably selected to optimize the processing.

As a result of examination of the region of welding of the steel cylinder blank material and the copper blank, it has proved that, in order that a sufficiently high welding strength is obtained at the cylindrical portion C provided on the copper blank, it is necessary that the portion C keeps an intimate and close contact with the steel cylinder blank material, throughout all steps after the compaction. To this end, as stated before, it is necessary to suitably select the sizes of the back-up punches used in respective steps.

Figure 9:
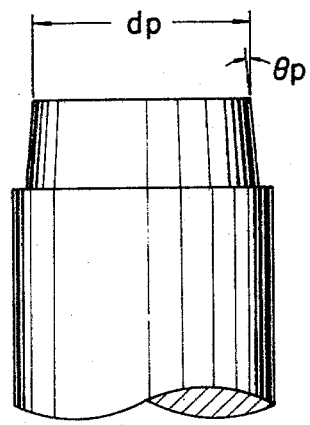
FIG. 9 shows the profile of a back-up punch.

More specifically, referring to FIG. 9, the outer diameter $d_p$ of the tip of the back-up punch, as well as the angle $\theta_p$ of the taper of the same, has to be at least equal to that of the preceding step.

The sizes and taper angles of the back-up punches used in the described embodiment are shown below, by way of example.

(1) back-up punch for pre-forming of copper blank: $d_p=38.4$ mm, $\theta_p=5°20'$
(2) back-up punch for compaction: $d_p=38.6$ mm, $\theta_p=6°30'$
(3) back-up punch for vane-shaping: $d_p=39$ mm, $\theta_p=6°30'$ Consequently, the anti-oxidation effect provided by the cylindrical portion C of the copper blank is ensured throughout all steps of process, and it has become possible to increase the length of region of welding up to $h_0+l_4$.

The sizes of the back-up punches as shown above are not of limiting sense. Rather, the sizes of the back-up punches are suitably selected, so as to afford the plastic spreading of the cylindrical portion C of the copper blank as the process proceeds.

Further, various numerical data as used in the description of the embodiment are not exclusive, and can be changed over wide ranges in accordance with the shape and size of the magnetron anode to be produced.

As has been described in detail, according to the invention, it is possible to produce a magnetron anode in which a copper anode having a plurality of vanes is formed precisely within a straight circular steel cylinder with a large welding strength to the latter, at a good mass-produceability, without making use of steel cylinder blank material having tapered inner peripheral surface which is indispensable in the conventional process, and without necessitating the quench-hardening of the steel cylinder blank material which is also essential in the conventional process.

In addition, thanks to the pre-forming of the disc-shaped copper blank, it becomes possible to obtain a larger area of welding of copper to the steel cylinder, with a smaller volume of the copper blank.

Consequently, the method of the invention contributes to the reduction of production cost of the magnetron anode, and offers various other advantages in the production of the magnetron anode.

What is claimed is:

1. A method of producing a magnetron anode having a plurality of copper vanes which extend radially inward from the inner peripheral surface of said copper anode toward the center of said copper anode comprising:

a first step of cleaning the outer peripheral surface of a copper blank and the inner peripheral surface of a straight steel cylinder blank material;

a second step of fitting said copper blank to the inside of said straight steel cylinder blank material so that the cleaned outer peripheral surface of said copper blank and the cleaned inner peripheral surface of said straight steel cylinder blank material contact each other, and then compacting said copper blank to said steel cylinder blank material;

a third step of preheating said copper blank compacted to said steel cylinder blank material and press working said copper blank by penetrating said copper blank with a shaping punch so that said steel cylinder blank material is raised in a direction opposite to the penetration of the shaping punch within a time region between the instant at which the shaping punch contacts said copper blank and the instant at which the shaping flow of said copper blank becomes steady, so as to maintain a constant length between the upper end of said steel cylinder blank material and the upper end of the peripheral portion of said copper blank after the compaction without causing relative sliding between said steel cylinder blank material and said copper blank; and a fourth step of effecting a post-treatment on the press-shaped copper blank and steel cylinder blank material so as to obtain a tight bonding and desired shape of said anode;

wherein said third step is carried out such that said steel cylinder blank material is made to move upward during said press working, the amount of rise of said steel cylinder blank material in said press-working of said third step being ((extrusion ratio)−1)×0.7 times as large as the penetration of said shaping punch.

2. A method of producing a magnetron anode comprising:

a first step of preforming a copper blank;

a second step of cleaning a peripheral surface of the copper blank and an inner cylindrical surface of a steel blank material;

a third step of fitting said copper blank to the inside of said steel blank material, such that the clean peripheral surface of said copper blank and the clean inner cylindrical surface of said steel blank material contact each other, and then compacting said copper blank into said steel blank material;

a fourth step of preheating said compacted copper blank to a temperature from about 200° to about 650° C. and press working said copper blank by penetrating the copper blank with a shaping punch while raising the steel blank material in a direction opposite the penetration of the shaping punch means, thereby to form and shape the blank within said steel blank material;

a fifth step of effecting a post-treatment on the press-shaped copper blank and steel blank material so as to obtain a tight bonding and desired shape of the resultant anode, wherein back-up punch means is used in each of the first, third and fourth steps to spread a lower cylindrical portion of the blank as the process proceeds to weld the copper blank to the steel blank material, the diameter of the back-up punch means increasing from the first step to the third step, and from the third step to the fourth step.

3. A method of producing a magnetron anode as claimed in claim 2, wherein the hardness of said steel blank material is at least twice that of said copper blank during compaction in said second step, and at least 4.5 times as large as that of said copper blank during press working in said third step.

4. A method of producing a magnetron anode as claimed in claim 2 or 3, wherein said steel blank material is selected from the group consisting of a steel material containing at least 0.45% carbon and low alloyed steels exhibiting blue brittleness.

5. A method of producing a magnetron anode as claimed in claim 1, wherein said steel cylinder blank material is made of a steel material containing at least 0.45% of carbon.

6. A method of producing a magnetron anode as claimed in claim 2, wherein said copper blank is preformed before it is cleaned and fitted to the inside of said steel cylinder blank material, and the compaction is effected at room temperature.

7. A method of producing a magnetron anode as claimed in claim 2, wherein said steel cylinder blank material is made of a steel material containing at least 0.45% of carbon.

8. A method of producing a magnetron anode as claimed in claim 1, wherein said fourth step includes a post-treatment and diffusion annealing, subsequent to the shaping of said copper vanes by said press working.

9. A method of producing a magnetron anode as claimed in claim 1, wherein said copper blank is made of an oxygen free copper.

10. A method of producing a magnetron anode as claimed in claim 2, wherein said fourth step is carried out such that said steel cylinder blank material is made to move upward during said press working an amount of rise equal to ((extrusion ratio)−1) or smaller times as large as an amount of penetration of said shaping punch.

11. A method of producing a magnetron anode as claimed in claim 10, wherein said press working in said fourth step is carried out to form a copper anode having a plurality of copper vanes which extend radially inwardly from the inner peripheral surface of said copper anode toward the center of said copper anode.

12. A method of producing a magnetron anode as claimed in claim 11, wherein said press working in said fourth step is carried out by moving said steel cylinder blank material in a reverse direction to said penetration of said shaping punch.

13. A method of producing a magnetron anode as claimed in claim 12, wherein the amount of rise of said steel cylinder blank material in said press working of said fourth step is ((extrusion ratio)−1)×0.7 times as large as the penetration of said shaping punch.

14. A method of producing a magnetron anode as claimed in claim 13, wherein said press working in said fourth step is effected by moving the die on which said steel cylinder blank material is supported in a reverse direction to said penetration of said shaping punch.

* * * * *